No. 722,650.
PATENTED MAR. 10, 1903.
G. S. BRAINERD.
STEAM TRAP.
APPLICATION FILED OCT. 25, 1902.
NO MODEL.
2 SHEETS—SHEET 1.
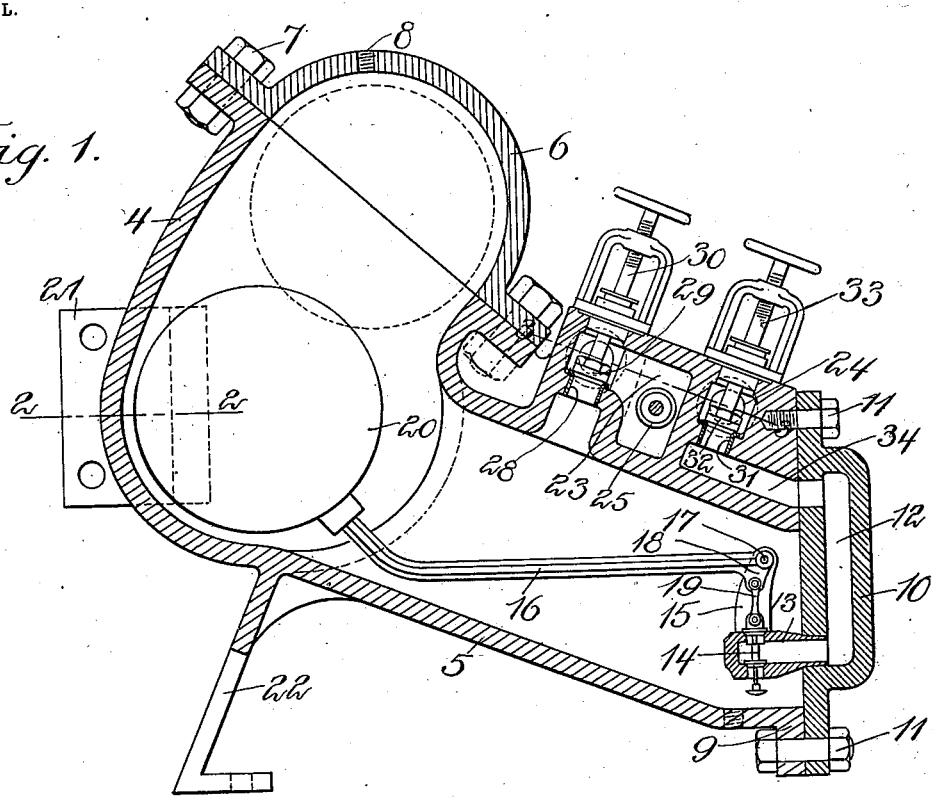
Fig. 1.
Fig. 2.
Fig. 3.
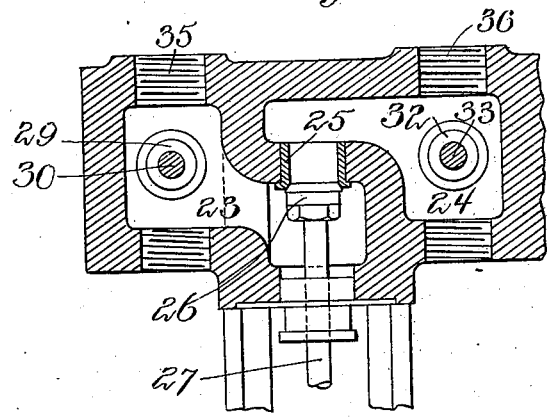
Witnesses:
E. Batchelder
C. C. Steeker
Inventor:
Geo. S. Brainerd
by Wright Brown & Quinby
Attys.
THE NORRIS PETERS CO., PHOTO-LITHO., WASHINGTON, D. C.

No. 722,650. PATENTED MAR. 10, 1903.
G. S. BRAINERD.
STEAM TRAP.
APPLICATION FILED OCT. 25, 1902.
NO MODEL. 2 SHEETS—SHEET 2.
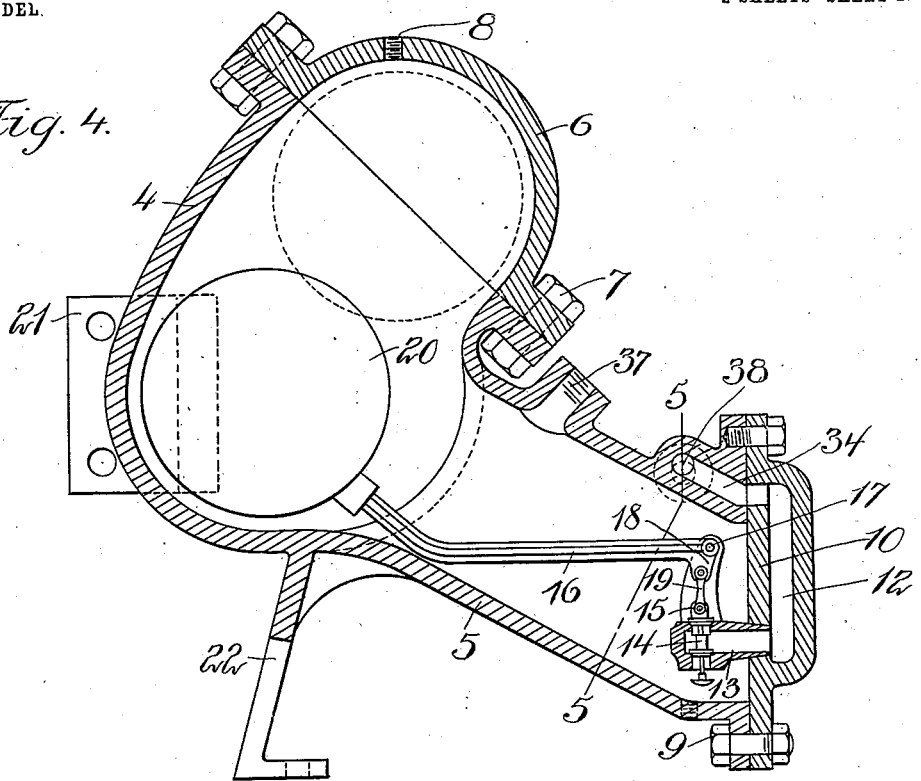
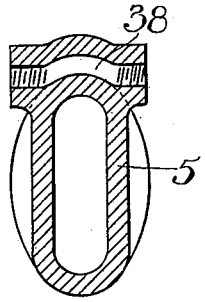
Witnesses:
E. A. Batchelder
C. C. Stecker
Inventor:
Geo. S. Brainerd
by Wright Brown & Quinby
Attys.

UNITED STATES PATENT OFFICE.

GEORGE SEGUR BRAINERD, OF BOSTON, MASSACHUSETTS.

STEAM-TRAP.

SPECIFICATION forming part of Letters Patent No. 722,650, dated March 10, 1903.

Application filed October 25, 1902. Serial No. 128,740. (No model.)

*To all whom it may concern:*

Be it known that I, GEORGE SEGUR BRAINERD, of Boston, in the county of Suffolk and State of Massachusetts, have invented certain new and useful Improvements in Steam-Traps, of which the following is a specification.

This invention relates to traps designed to separate water of condensation from steam either in steam heating apparatus or ordinary steam-boilers.

The object of the invention is to produce an improved trap of this character which is particularly applicable for use on board vessels, where the movement of the vessel and the machinery is liable to cause an agitation of the water in the trap.

A further object of the invention is to provide a device of this character in which the discharge-point is at an elevated point, so as to permit of the location of the trap closer to the support on which it rests than has heretofore been practicable.

A further object is to provide a trap requiring little or no piping in the by-pass; and another object is to provide a construction which will enable the body of the trap to be made of relatively cheap material, as cast-iron, while such parts as are required to be most durable may be of the composition such as required by the United States Government for valve-seats and other parts.

To these ends the invention consists in the construction and arrangement of parts, substantially as hereinafter described and claimed.

Of the accompanying drawings, Figure 1 represents a vertical sectional view of a trap, showing an embodiment of the present invention. Fig. 2 represents a section on line 2 2 of Fig. 1. Fig. 3 represents a detail section on line 3 3 of Fig. 1. Fig. 4 represents a section similar to a part of Fig. 1, illustrating a slightly-different embodiment of the invention, as hereinafter described. Fig. 5 represents a detail section on line 5 5 of Fig. 4.

The same reference characters indicate the same parts in all the figures.

The casing of the trap comprises the float-receiving upper portion 4, which is of a size and shape to receive the float quite snugly. The lever-receiving lower portion 5 of the casing inclines downwardly from the portion 4 and is materially reduced in cross-sectional area, so as to afford but slightly more than space to permit of the oscillations of the float-lever. The upper portion 4 of the casing is provided with flanges, to which the cap 6 is secured by suitable bolts 7, passing through a flange of the cap and the flange of the portion 4. Said cap is preferably provided with an air-cock fitted to the aperture 8. The lower end of the inclined portion 5 of the casing is provided with a flange 9, to which is bolted the removable end piece or head 10, the bolts being indicated at 11. Said end piece 10 is provided with a passage 12, the upper end of which communicates with the valve-casing 13, formed with seats, to which a valve 14 is fitted. This construction of the removable end piece with the outlet-passage 12 and the valve-casing 13 is or may be substantially the same as shown in my Patent No. 583,394, granted May 25, 1897, with the exception that the outlet-passage in the present case leads upwardly instead of downwardly, as will be hereinafter more fully explained.

Suitably pivoted within the casing, as to ears 15, rising from the valve-casing, is a float-lever 16, the pivot being indicated at 17. Said lever has a short arm 18 projecting downwardly from its pivoted point and slightly forward from said point. A link 19 connects said short arm of the lever with the valve 14, the arrangement being such that a great leverage is obtained to unseat the valve against high pressures.

The lever 16 is curved and is provided at its outer end with a float 20. The curvature of the lever permits the float to pass up into the upper enlarged portion of the casing without having to provide such a large lever-receiving portion 5 as would be necessary if the lever were straight.

As so far described the construction is substantially the same as shown in my application, Serial No. 121,040, filed August 26, 1902, with the exception as to the direction in which the passage 12 leads.

At 21 a side web is represented, said web being provided with screw or bolt holes and being cast integral with the casing 4. This web is to enable the trap to be secured to a side wall when desired, the other end of the trap preferably resting in such case upon some projection or upon a suitable bracket. The casing is also provided with a web or strut 22 for resting upon a bracket or shelf when the latter is employed. As so far described the construction is substantially the same in both forms illustrated. In each form the lower portion of the casing will have a shape in cross-section substantially as indicated in Fig. 5.

Referring to Figs. 1 and 3, it will be seen that the upper part of the portion 5 of the casing is formed with certain passages, which are controlled by valves. Said upper portion of the casing is formed with two chambers 23 and 24, respectively, separated by a web having an aperture provided with a bushing 25. One end of said bushing is formed as a valve-seat for the valve 26, controlled by a stem 27.

The chamber 23 is separated from the main trap-chamber by a web having an aperture provided with a bushing 28, said bushing formed at one end as a valve-seat with which a valve 29 coacts. The stem of the valve 29 is indicated at 30. The bottom of the chamber 24 is formed with an aperture having a bushing 31, one end of which is formed as a valve-seat. A valve 32, having a stem 33, coacts with the valve-seat at the end of the bushing 31. The passage controlled by the valve 32 communicates with a port or passage 34, which latter at its lower end communicates with the upper end of the passage 12, formed in the removable end piece or head 10.

The walls of the chambers 23 and 24 above the webs in which the valve-seat bushings are located are formed with threaded apertures on each side, so as to enable pipes to be led therefrom either to the right or to the left. It is to be understood that the threaded apertures with which no pipes are connected will be closed by plugs.

Referring to Fig. 3, it is to be supposed that the steam-pipe is connected with the aperture 35 and the outlet or discharge pipe is to be connected with the threaded passage 36, the threaded passage opposite thereto being closed by plugs. When the valves 29 and 32 are open and the valve 36 closed, steam enters at 35 and passes through the valve-aperture having the bushing 28 into the trap-casing. When the float 30 rises, due to the accumulation of water of condensation in the trap, the valve 14 opens, and the discharge of water occurs through the passages 12 and 34, past the valve 32, and out at 36; but when repairs are to be made and if for that purpose it is desirable to remove the end piece 10 the valve 29 is closed upon the seat at the end of the bushing 28 and the valve 26 will be opened, thus providing for a short by-pass contained within the casting comprising the body or casing of the trap. It will be seen that by this construction I have provided means whereby all by-pass piping is dispensed with, it being only necessary to connect the ordinary supply and discharge pipes with the threaded apertures 35 and 36. It will also be seen that by this construction I provide means whereby the valves and valve-seats may be made of composition to meet such requirements as those made by the United States Navy, while the body of the casing itself may be made of cast-iron, thus providing a trap far cheaper than one in which the body of the casing is entirely made of composition.

With the construction shown of the self-contained by-pass there is a much less number of joints to be provided with packing than when the by-pass is constructed of separate pipes, such as shown in my application above referred to and as has been common prior to this present invention.

Referring to Fig. 4, it will be seen that I have produced a trap which will necessarily be much cheaper in form, although it will require a short amount of by-pass piping and the necessary valves in said piping. In said Fig. 4 I have shown the connection for the inlet or supply pipe at 37, while the outlet-passage 34 from the passage 12 leads to a cross-passage 38, (see Fig. 5,) which is threaded at each end for the connection therewith of a discharge-pipe and a plug, according to which direction of lead is to be given to the pipe. As above stated, when a by-pass connection is to be made for use with the trap shown in Figs. 4 and 5 suitable piping will be employed; but owing to the close proximity of the inlet and discharge openings 37 and 38, respectively, the necessary piping will be very slight and in a position where it will not be liable to be struck and possibly loosened by passing objects.

In both forms of trap the leading of the discharge upward instead of downward from the valve-casing 13 avoids the necessity of providing for a passage below the flange 9. I am therefore enabled to mount the trap lower than when room has to be provided for a discharge-pipe leading under the trap.

I claim—

1. A steam-trap comprising a casing having a float-controlled outlet, a discharge-passage leading upward from said outlet and over the top of the casing, said passage being formed within the walls of the casing, and means for controlling the discharge therefrom.

2. A steam-trap comprising a casing having a float-controlled outlet, and a discharge-passage leading upward therefrom to the top of the trap-casing, said passage being formed within the walls of the casing, and means for connecting an inlet or supply pipe with the top of the casing adjacent to the discharge-opening.

3. A steam-trap comprising a float-controlled outlet, and a passage leading therefrom to the top of the casing, chambers formed in the body of the casing, one of said chambers having a valved passage communicating with the passage leading from the trap-chamber, the other chamber having a valved passage for admitting steam to the trap-chamber, and a valve-controlled passage between the two chambers.

4. A steam-trap comprising a casing having a float-receiving upper portion and a downwardly-inclined lever-receiving portion of contracted cross-sectional area, a valve-controlled outlet from the lower portion, a float-lever in the casing, and connections between said lever and the valve, the said contracted portion of the casing extending the entire length of the lever.

5. A steam-trap comprising a casing having a float-receiving upper portion and a reduced or contracted lever and valve receiving portion, the said upper portion having a removable cap, the contracted portion being but slightly wider than the width of the lever and comprising all that portion of the casing within which the lever works.

In testimony whereof I have affixed my signature in presence of two witnesses.

GEORGE SEGUR BRAINERD.

Witnesses:
C. F. BROWN,
E. BATCHELDER.